United States Patent
Vasseur et al.

(10) Patent No.: US 9,444,727 B2
(45) Date of Patent: Sep. 13, 2016

(54) DUPLICATING TRAFFIC ALONG LOCAL DETOURS BEFORE PATH REMERGE TO INCREASE PACKET DELIVERY

(71) Applicant: Cisco Technology, Inc., San Jose, CA (US)

(72) Inventors: Jean-Philippe Vasseur, Saint Martin d'Uriage (FR); Jonathan W. Hui, Belmont, CA (US); Atul B. Mahamuni, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 476 days.

(21) Appl. No.: 13/652,971

(22) Filed: Oct. 16, 2012

(65) Prior Publication Data

US 2014/0105033 A1    Apr. 17, 2014

(51) Int. Cl.
  *H04L 12/26* (2006.01)
  *H04L 12/707* (2013.01)
  *H04L 12/24* (2006.01)

(52) U.S. Cl.
  CPC .......... *H04L 45/24* (2013.01); *H04L 41/0668* (2013.01); *H04L 43/0811* (2013.01)

(58) Field of Classification Search
  USPC ........................................ 370/248, 392, 252
  See application file for complete search history.

(56) References Cited

U.S. PATENT DOCUMENTS

| | | | |
|---|---|---|---|
| 6,804,532 B1 | 10/2004 | Moon et al. | |
| 6,961,573 B1 | 11/2005 | Moon et al. | |
| 6,970,449 B1 | 11/2005 | Smith et al. | |
| 7,146,186 B1 | 12/2006 | Moon et al. | |
| 7,295,844 B1 | 11/2007 | Moon et al. | |
| 7,756,040 B1 | 7/2010 | Andriantsiferana et al. | |
| 8,018,917 B2 | 9/2011 | Ramalho | |
| 8,077,675 B2 | 12/2011 | Stephenson et al. | |
| 8,451,817 B2 | 5/2013 | Cheriton | |
| 2005/0271049 A1* | 12/2005 | Jain et al. | 370/389 |
| 2009/0268747 A1* | 10/2009 | Kurata et al. | 370/412 |
| 2010/0172265 A1* | 7/2010 | Wheeler et al. | 370/252 |

(Continued)

OTHER PUBLICATIONS

Clausen, et al., "The LLN On-Demand Ad Hoc Distance-Vector Routing Protocol—Next Generation (LOADng)", Network Working Group, Internet Draft, draft-clausen-lln-loadng-02, Mar. 12, 2012, 44 pages, Internet Engineering Task Force Trust.

(Continued)

*Primary Examiner* — Dang Ton
*Assistant Examiner* — Pamit Kaur
(74) *Attorney, Agent, or Firm* — Parker Ibrahim & Berg LLC; James M. Behmke; Stephen D. LeBarron

(57) ABSTRACT

In one embodiment, a source node monitors a quality of a primary link, and forwards one or more duplicate copies of a packet in response to poor quality of the primary link. Specifically, forwarding generally comprises transmitting a first copy of the packet on the primary link with an indication of duplicate copies, and transmitting a second copy of the packet on a backup link with an indication of duplicate copies. In another embodiment, an intermediate node receives a first copy of a packet with an indication of duplicate copies, and stores an identifier of the first copy of the packet in response to the indication. Upon receiving a second copy of the packet with the indication of duplicate copies, the node determines whether the identifier of the second copy matches the stored identifier of the first copy, such that in response to a match, the second copy is dropped.

16 Claims, 9 Drawing Sheets

(56) References Cited

U.S. PATENT DOCUMENTS

| | | | |
|---|---|---|---|
| 2010/0254262 A1* | 10/2010 | Kantawala et al. | 370/392 |
| 2011/0176416 A1* | 7/2011 | Bhatti et al. | 370/230 |
| 2011/0310764 A1 | 12/2011 | Ramalho | |
| 2012/0307842 A1* | 12/2012 | Petrov et al. | 370/474 |
| 2013/0051250 A1 | 2/2013 | Shaffer et al. | |
| 2013/0287024 A1* | 10/2013 | Herberg et al. | 370/392 |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

\* cited by examiner

DUPLICATING TRAFFIC ALONG LOCAL DETOURS BEFORE PATH REMERGE TO INCREASE PACKET DELIVERY

TECHNICAL FIELD

The present disclosure relates generally to computer networks, and, more particularly, to path protection techniques using duplicate transmissions.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example architecture that may typically be classified as an LLN is an "Internet of Things" (IoT) architecture. Generally, most routing protocols designed for the IoT are distance vector, including both proactive and reactive protocols. Distance vector protocols are much better suited to the limited memory and communication constraints that are typical of IoT devices. Link state protocols incur too much overhead to be feasible on IoT devices. However, one challenge with distance vector protocols is the difficulty of building diverse paths, which are critical in networks that must relay time-sensitive information (e.g., "Class 0" traffic in Industrial Automation, delay sensitive traffic for teleprotection, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
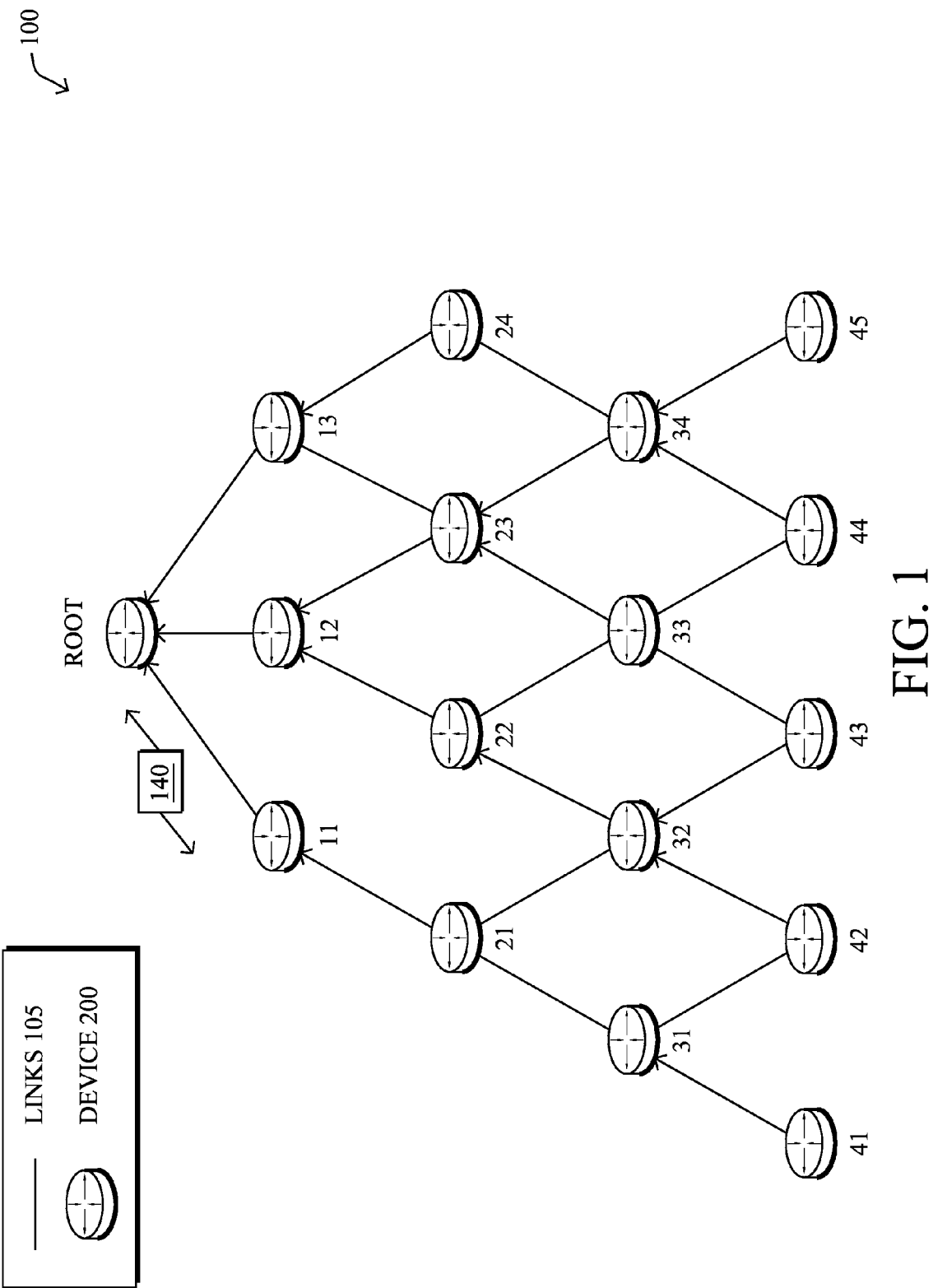
FIG. 1 illustrates an example communication network.

According to one or more embodiments of the disclosure, a source node monitors a quality of a primary link, and forwards one or more duplicate copies of a packet in response to a poor quality of the primary link. Specifically, forwarding generally comprises transmitting a first copy of the packet on the primary link with an indication of duplicate copies, and transmitting a second copy of the packet on a backup link with an indication of duplicate copies.

According to one or more additional embodiments of the disclosure, an intermediate node receives a first copy of a packet with an indication of duplicate copies, and stores an identifier of the first copy of the packet in response to the indication. Upon receiving a second copy of the packet with the indication of duplicate copies, the node determines whether the identifier of the second copy matches the stored identifier of the first copy, such that in response to a match, the second copy is dropped.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
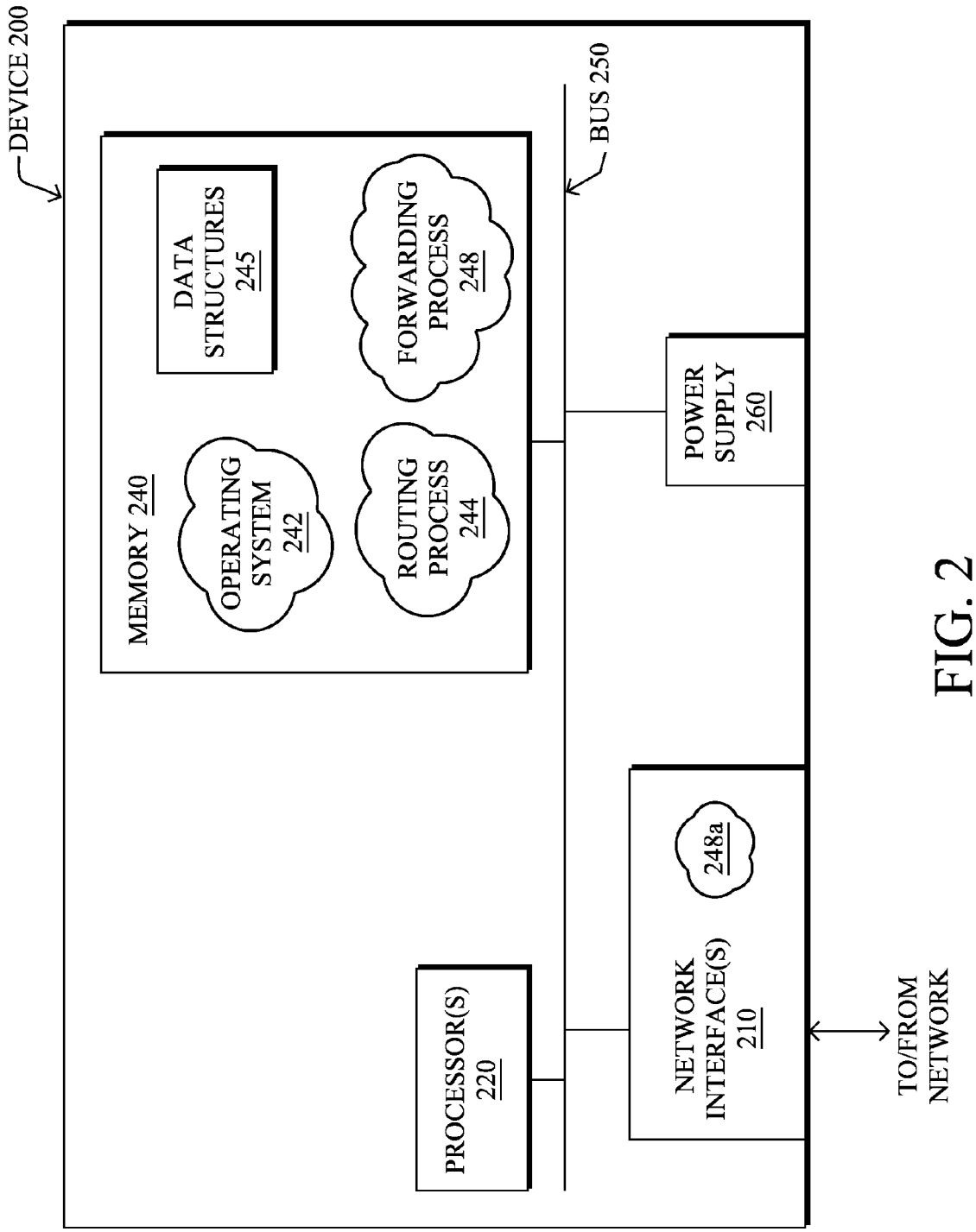
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative forwarding process 248, as described herein. Note that while forwarding process 248 is shown in centralized memory 240, alternative embodiments provide for the process to be specifically operated within the network interfaces 210, such as a component of a MAC layer (process "248*a*").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), LLN On-demand Ad hoc Distance-vector (LOAD), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

An example reactive routing protocol is specified in an IETF Internet Draft, entitled "LLN On-demand Ad hoc Distance-vector Routing Protocol—Next Generation (LOADng)" <draft-clausen-lln-loadng-02>by Clausen, et al. (Mar. 12, 2012 version), provides a reactive routing protocol for LLNs, e.g., as derived from AODV. Other reactive routing protocol efforts include the G3-PLC specification approved by the ITU, and also one described in an informative annex of IEEE P1901.2.

One of the most fundamental paradigms common to routing protocols is that a link is either UP (functional) or DOWN (failed). Routing protocols select a best next-hop, or multiple next-hop when performing load balancing and forward packets according to their routing table. Should the link fail, packets are rerouted along the shortest back-up path that may be dynamically computed or may have been pre-computed. However, as noted above, most routing protocols designed for the IoT are distance vector, including both proactive and reactive protocols, since distance vector protocols are much better suited to the limited memory and communication constraints that are typical of IoT devices. One noted challenge with distance vector protocols is the difficulty of building diverse paths, which are critical in networks that must relay time-sensitive information (e.g., "Class 0" traffic in Industrial Automation, delay sensitive traffic for teleprotection, etc.).

Several rerouting approaches have been designed over the past few years known as Fast Reroute (FRR) that do not apply to LLNs, as they require link state routing protocols. Lately, local repair has been specified for distance vector proactive routing (e.g., RPL) or reactive routing (e.g., LOAD-ng using path error (PERR) messages). Unfortunately, while local repair may help find alternate paths in simple cases, it may not be sufficient to provide a high reliability in all situations. In addition, "1+1" traffic protection in general (sending duplicate copies of protected packets over diverse links) is a useful approach for highly sensitive traffic, but is very costly in terms of control plane and data plane overhead.

Duplicating Traffic along Local Detours

The techniques herein significantly improve packet delivery in constrained networks (e.g., LLNs) by using localized 1+1 protection, where the use and parameters of 1+1 protection are dynamically adjusted based on local feedback mechanisms. In particular, the techniques herein use localized 1+1 protection (sending N copies of a packet where N may be dynamically computed based on closed-loop feedback) upon detecting a weak or failed link, without requiring extra control plane to compute diverse paths or an alternate diverse path. Notably, the techniques herein provide the ability to duplicate traffic along a limited path segment (in contrast with existing solutions) up to a point where the paths remerge in the network, while offering improved recovery times with limited control and data plane overhead.

Specifically, according to one or more embodiments of the disclosure as described in detail below, a source node monitors a quality of a primary link, and forwards one or more duplicate copies of a packet in response to a poor quality of the primary link. In particular, forwarding generally comprises transmitting a first copy of the packet on the primary link with an indication of duplicate copies, and transmitting a second copy of the packet on a backup link with an indication of duplicate copies. Thereafter, when an intermediate node receives a first copy of a packet with an indication of duplicate copies, it stores an identifier of the first copy of the packet in response to the indication. Upon receiving a second copy of the packet with the indication of duplicate copies, the node determines whether the identifier of the second copy matches the stored identifier of the first copy, such that in response to a match, the second copy is dropped.

Illustratively, the techniques described herein may be performed by hardware, software, and/or firmware, such as in accordance with the forwarding process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional forwarding protocols, and as such, may be processed by similar components understood in the art that execute those protocols, accordingly.

Figure 3:
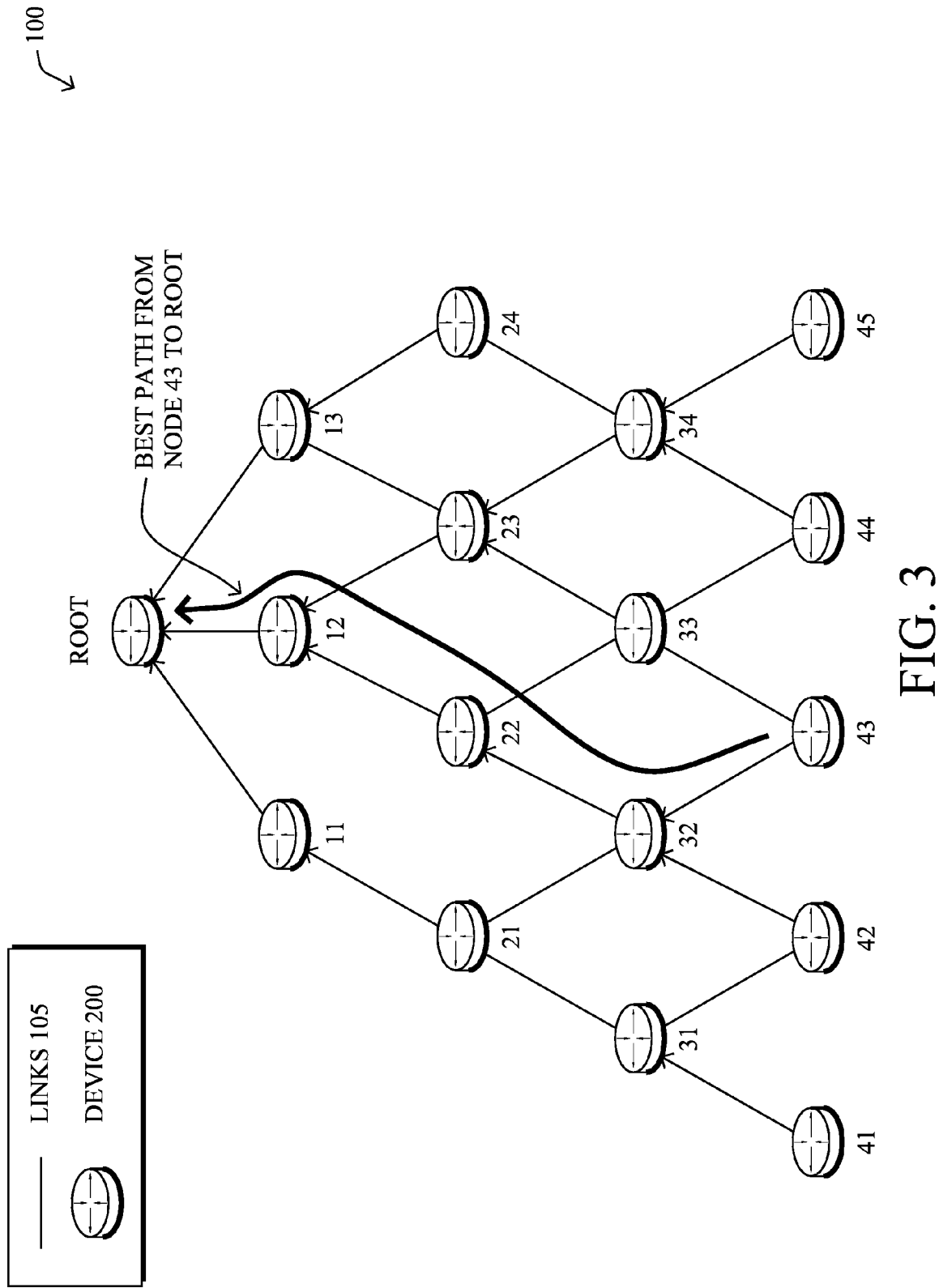
FIG. 3 illustrates an example best path within the communication network.

Operationally, in steady state, a node performs its best next hop selection according to a given routing protocol mode of operation. For example, as shown in FIG. 3, a best path from node 43 to the root node (e.g., an LBR) is 43-32-22-12-Root. With current mechanisms, should a link become weak or fail, the node would select a different path (according to its routing table or otherwise) and packets would be rerouted along an alternate path. As pointed out above, several rerouting approaches have been designed over the past few years such as Fast Reroute (FRR), etc. Though local rerouting is often a viable option, it is pretty common in lossy networks to be in a situation where both paths are lossy (primary and back-up), thus local rerouting only partially meets the requirements of successful packet transmission. As also noted above, other techniques such as 1+1 may be used where diverse paths are computed between a pair of nodes and packets are duplicated along both paths, but such techniques are very costly.

The techniques herein propose a radically different approach consisting of using locally scoped 1+1, without requiring any extra control overhead. (Note that the techniques herein are generally directed toward the forwarding plane, and are not tied to any particular routing protocol.)

A first component of the techniques herein involves having a device forward a copy of a packet to a backup parent in response to observing a weak or down link to the primary parent. Illustratively, a decrease in link quality may be observed by monitoring link metrics such as RSSI, SNR, and/or ETX. In response to observing a weak link to the primary parent, the device may performs the following steps, with reference generally to FIGS. 4A-4D:

1) The sending node (e.g., node 43) starts sending duplicated packets. The first copy of the packet is sent to the primary parent with a newly specified flag (e.g., called "DUP"). The flag may be encoded in an IPv6 Hop-by-Hop Option header.

2) The sending node also sends a copy of the original packet along to a backup next hop (e.g., node 33) with the DUP flag.

Both the primary and backup next-hop routers forward the packet normally. If a router (intermediate node) receives a packet with the DUP flag, the router checks whether has already forwarded a copy of the packet. In one embodiment, the router may identify packets using a hash of the packet, or a copy of the entire packet itself. In another embodiment, the router that inserts the DUP flag may also include a sequence number to identify the packet. In either case, the routers maintain a cache of identifiers (hash, sequence number, or packet itself) to identify packets that were recently forwarded by the router. Each cache entry (stored identifier) may deleted after expiration of a timer T-note that the cached packed may be kept even after dropping the copy of the first packet, should a third packet be received. When forwarding a packet, if the packet identifier exists within the cache, the router drops the duplicated packet.

As a result, packets get locally duplicated using diverse 1+1 for a period of time, while suppressing duplicate packets where the 1+1 paths merge.

In one embodiment, routers may be configured with different policies that govern when to apply 1+1. For example, different thresholds may be used to enable 1+1 based on DIP, DSCP values, Flow Labels, etc.

Referring again to the example (particularly FIG. 4B), where the mechanism proposed in this invention is triggered because the quality of the link 43-32 is determined as too low, two copies of the same packet may reach node 22: the first packet would be forwarded and the second packet dropped. Should one of the copies be dropped due to lossy (or failed) link, a single copy would be received and the hash would be flushed after the expiration of the timer T.

In one embodiment, a router may send duplicated packets to an arbitrary neighbor (on an arbitrary link). Doing so increases the amount of diversity that a router can exploit. However, the downside is that it may cause forwarding loops. One technique to avoid forwarding loops is to record an identifier of the router that duplicated the packet within the packet itself along with the DUP flag to ensure that the packet will never be forwarded back to the router. Another technique is to include a depth value within the distance-vector topology (e.g., RPL Rank) to ensure that duplicated packet will only go towards the root (i.e., to prevent the duplicate copies from traversing links away from a destination of the packet). Still another is to otherwise ensure that the copies are specifically forwarded to nodes having a lower rank, i.e., closer to a root node.

Figure 4A:
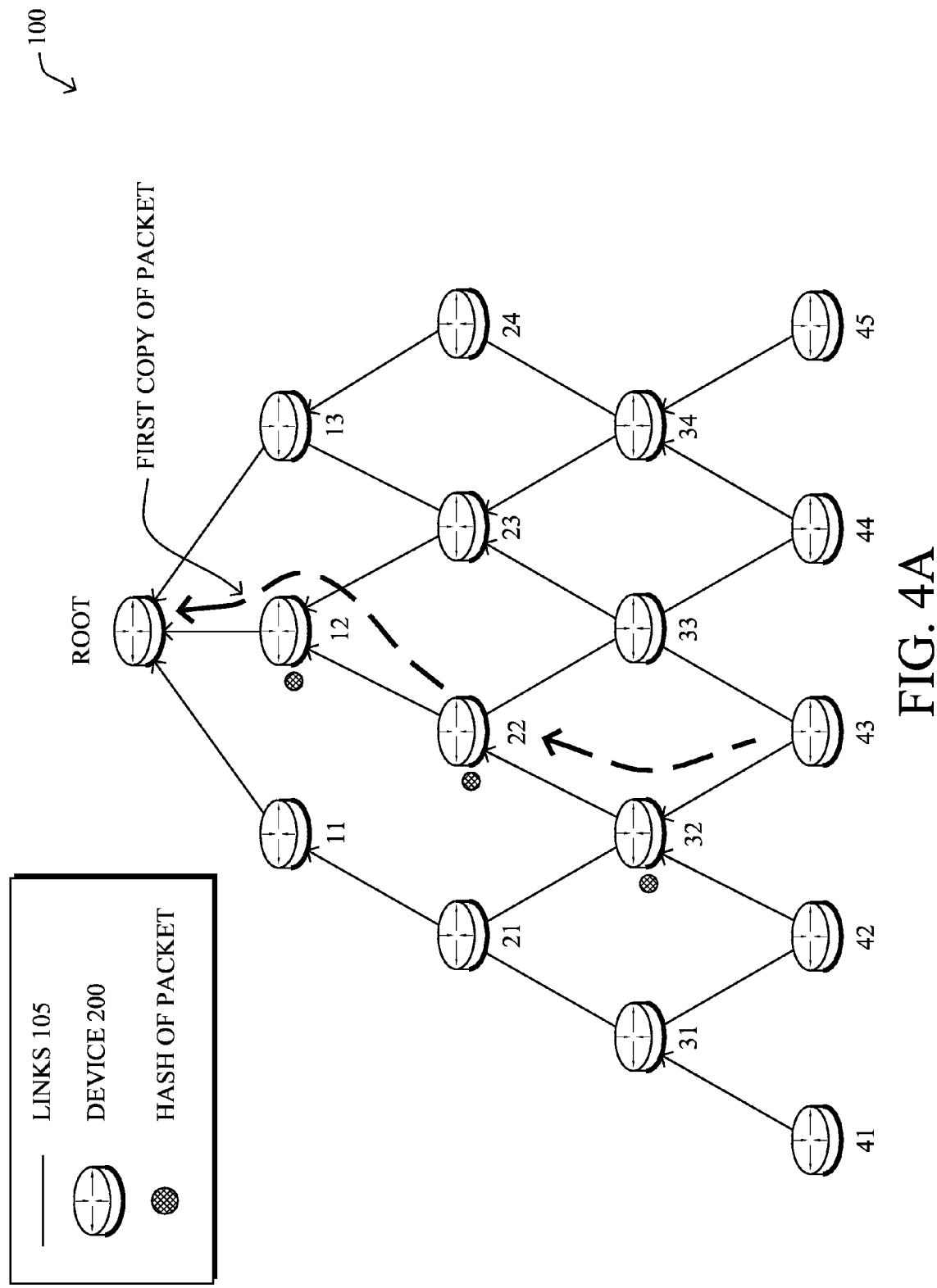
FIGS. 4A-D illustrate examples of duplicating traffic along local detours within the communication network.
Figure 4B:
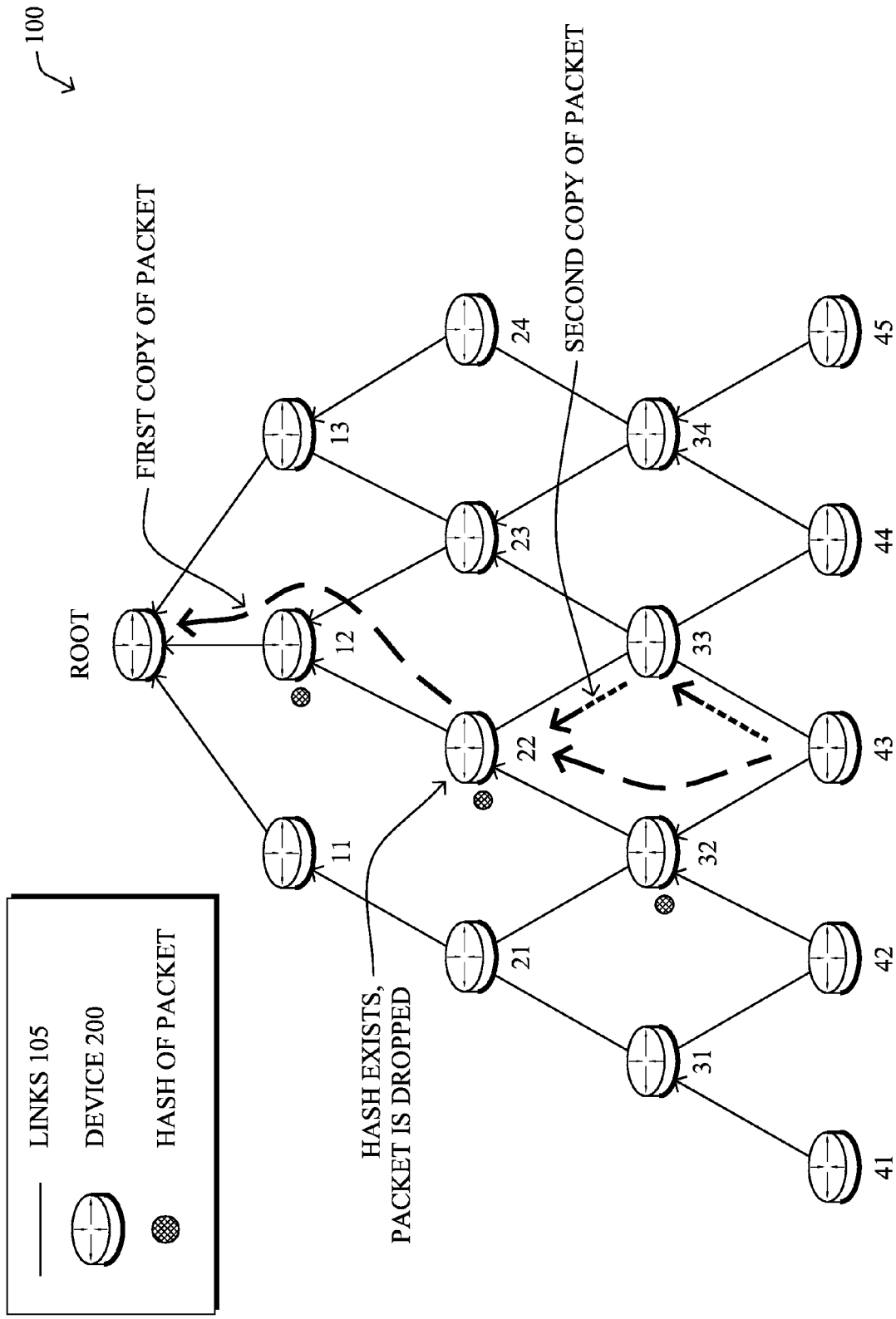
Figure 4C:
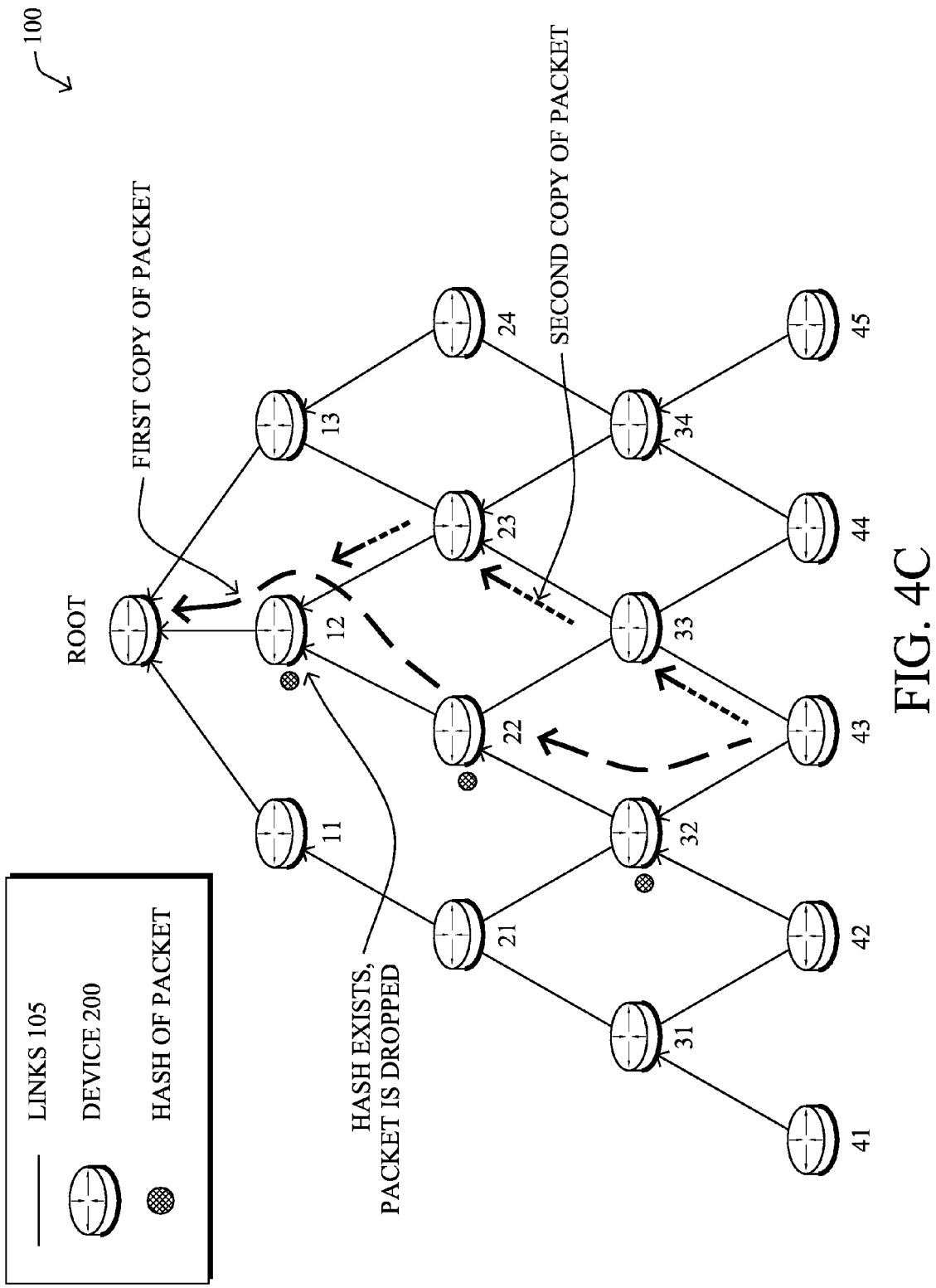

From analysis based on known topologies, changes in link connectivity are typically localized. As a result, this local 1+1 technique is ideally suited to such cases: the probability of successful delivery is dramatically increased compared to existing rerouting techniques while avoiding costly construction of 1+1 end-to-end paths. FIG. 4C illustrates another example where the duplicates remerge farther along the routing topology: still, this shows that such rerouting technique is more optimal situation than a full end-to-end 1+1 packet duplication.

When multiple routers along a path apply 1+1 to the same packet, the number of copies may increase beyond two packets. In most cases, the paths will merge since distance-vector protocols build paths that convert towards a single source/root (in the worst case, the merge at the root). In one embodiment, routers may be configured to limit the number of times 1+1 is applied to a packet (that is, duplicating a duplicated packet). When IPv6-in-IPv6 tunneling is used, the number of tunnel headers may indicate the number of times 1+1 was applied. Alternatively, the IPv6 Hop-by-Hop Option may include a count of the number of times 1+1 was applied.

Figure 4D:
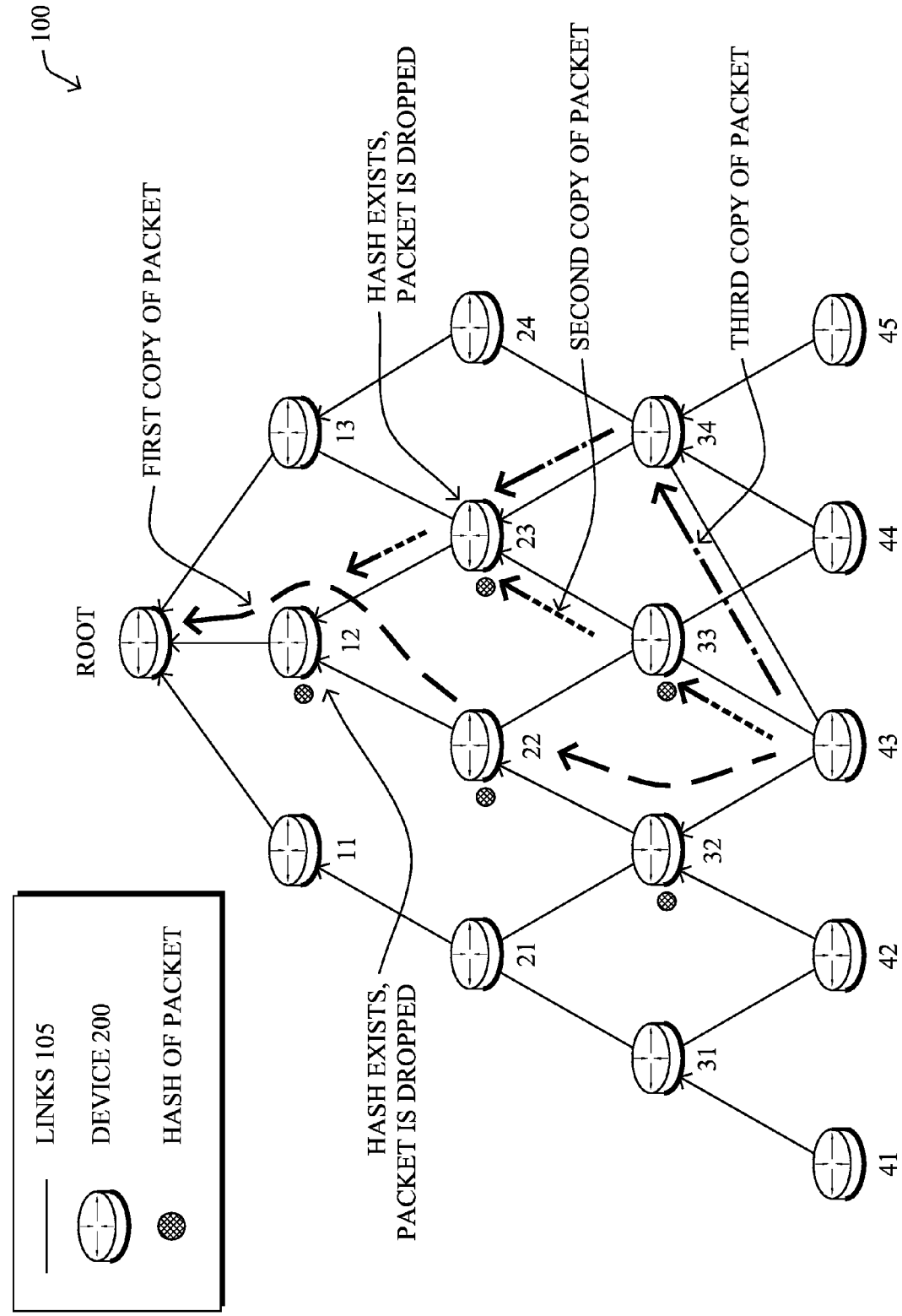

In addition, a router need not be limited to only generating one duplicate of a packet. In particular, in another embodiment, a node may choose to send N copies of the packet (one to each of its N neighbors including (or not) the preferred parents), where duplicates would be eliminated whenever paths re-merge in the network. For instance, FIG. 4D illustrates such a situation where the node 43 sends three copies of the same packet (e.g., for a highly critical packet) after detecting that the link 43-32 is too weak. According to the techniques herein, duplicated packets are eliminated both by the node 23 and 12, thus limiting the number of copies of the same packet in the network, still without requiring complex path computation and limiting the region in the network where duplicated packets are forwarded.

Another component of the techniques herein consists of dynamically computing the optimum value of N, which may greatly vary depending node location in the network. A first example feedback is the percentage/number of acknowledged packets when the link quality crosses a low threshold and the mechanism described herein is triggered. If a high percentage of DUP-packets is achieved, the number N may be decreased using a linear approach. A second example form of feedback consists of the nodes upstream that receive (and drop) duplicate packets to record the number of duplicates and to provide feedback regarding the information of an amount of duplicate copy drops (e.g., in the routing control plane packets used to build the routing topology).

By recording the node-ID of a node performing packet duplicate drops and the number of dropped duplicates, the source node can dynamically adjust the optimum value for the set N. For example, if the number of duplicates is high, N may be decreased. Alternatively or in addition, should the remerge node be further from the duplicating node, the duplicating node may decide to further decrease the value of N in an attempt to avoid consuming too great an amount of resources in the network.

In yet another embodiment, the receiving intermediate node (e.g., node 22) may buffer the packet itself, wait for the reception of the copy (before the expiration of T) and may choose the best copy or even rebuild the original copy using known techniques. That is, the node may store the first copy of the packet, and decide whether to drop the first or second copy based on a quality of the duplicate packets, or may reconstruct a damaged packet from a combination of the two.

Figure 5:
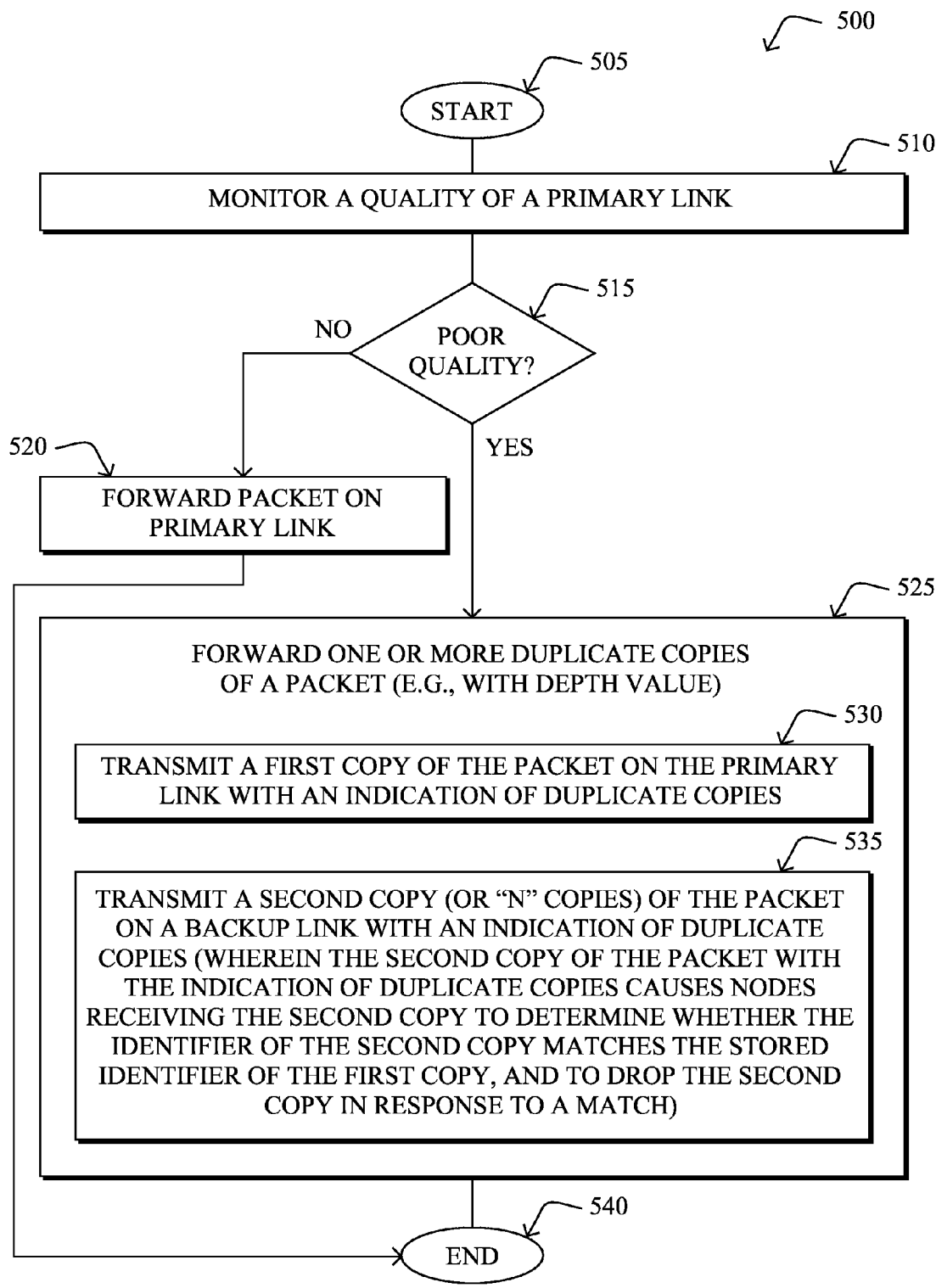
FIG. 5 illustrates an example simplified procedure for duplicating traffic along local detours in a communication network, particularly from the perspective of a source node.

FIG. 5 illustrates an example simplified procedure 500 for duplicating traffic along local detours in a communication network in accordance with one or more embodiments described herein, particularly from the perspective of a source node. The procedure 500 may start at step 505, and continues to step 510, where, as described in greater detail above, a source node (e.g., node 43) monitors a quality of a primary link (e.g., link 43-32) along a primary path, and determines its associated quality. If in step 515 the quality is acceptable (e.g., above a given metric threshold), then in step 520 a packet is simply transmitted on the primary link. However, if the quality is poor (e.g., below the threshold), then in step 525 the source node may forward one or more duplicate copies of the packet (e.g., with a depth value as noted above). Specifically, to forward the duplicate copies in step 525, sub-step 530 transmits a first copy of the packet on the primary link with an indication of duplicate copies, and sub-step 535 transmits a second copy (or "N" copies) of the packet on a backup link with an indication of duplicate copies. In this manner, with illustrative reference to FIG. 6 below, the second copy of the packet with the indication of duplicate copies causes nodes receiving the second copy to determine whether the identifier of the second copy matches the stored identifier of the first copy, and to drop the second copy in response to a match. The procedure 500 may then end in step 540, notably with the option of the source node receiving one or more acknowledgements or feedback for the duplicate packets (e.g., to select values of "N") as mentioned above, and to send additional packets if needed.

Figure 6:
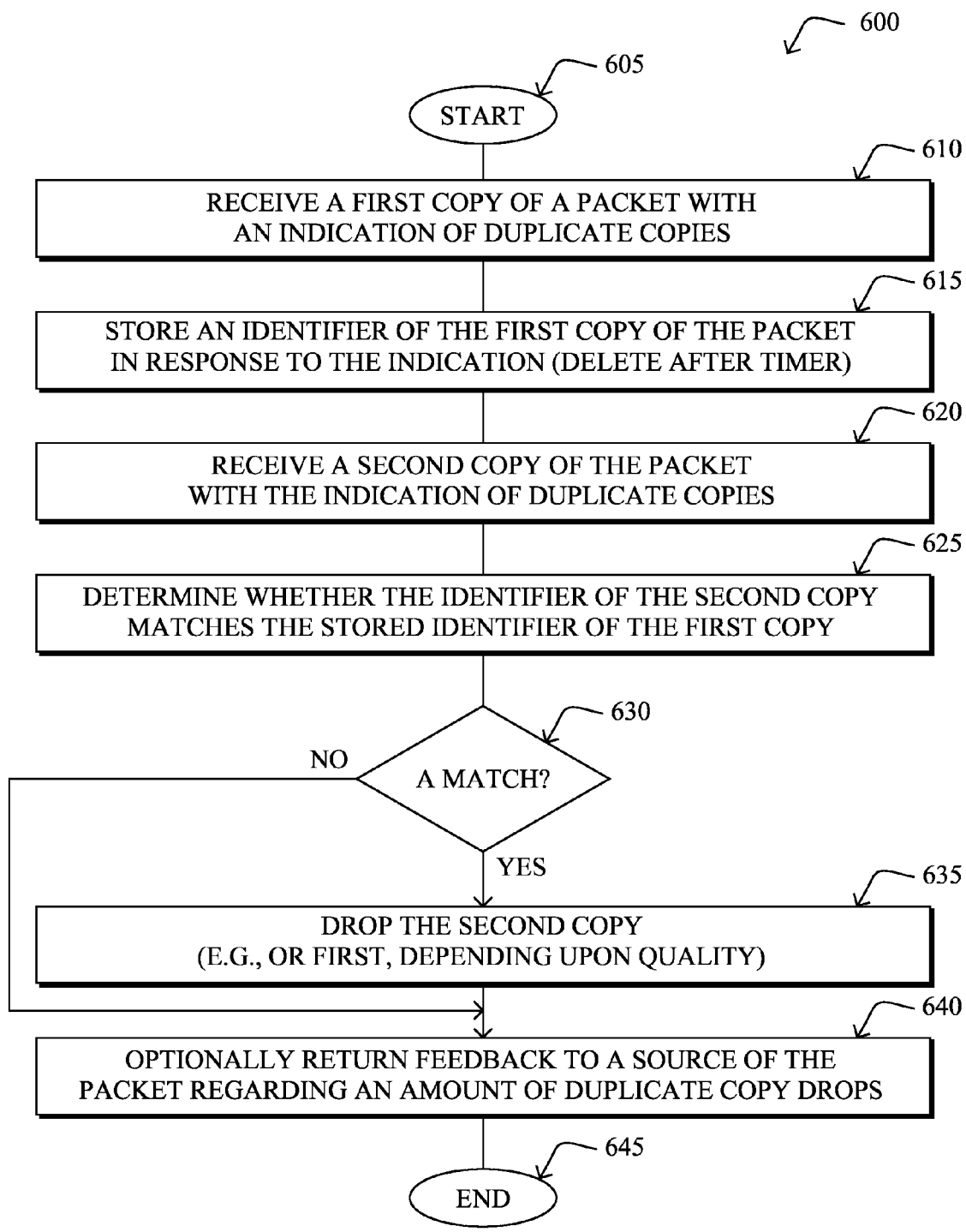
FIG. 6 illustrates another example simplified procedure for duplicating traffic along local detours in a communication network, particularly from the perspective of an intermediate node.

In addition, FIG. 6 illustrates another example simplified procedure 600 for duplicating traffic along local detours in a communication network in accordance with one or more embodiments described herein, particularly from the perspective of an intermediate node. The procedure 600 may start at step 605, and continues to step 610, where, as described in greater detail above, where an intermediate node (e.g., node 22) receives a first copy of a packet with an indication of duplicate copies, and stores an identifier of the first copy of the packet in step 615 in response to the indication (which may be deleted after a timer, as noted). Should the intermediate node receive a second copy of the packet with the indication of duplicate copies, then in step 625 the node determines whether the identifier of the second copy matches the stored identifier of the first copy (thus indicating that it is, in fact, a second copy of the packet). If in step 30 the identifiers match, then in step 635 the node drops the second copy (e.g., or the first, depending upon quality, as mentioned above). Optionally, in step 640, the node may return feedback to a source of the packet regarding an amount of duplicate copy drops, or an acknowledgement. The procedure 600 may then end in step 645, notably with the option to continue receiving duplicate packets or additional packets (with different identifiers).

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide for duplicating traffic along local detours in a communication network. In particular, the techniques herein significantly improve packet delivery ratio without requiring extra control plane cost, of particular use within a lossy environment (e.g., LLN, IoT, etc.), and without requiring duplicate traffic end-to-end (which is costly in terms of bandwidth).

While there have been shown and described illustrative embodiments that provide for duplicating traffic along local detours in a communication network, it is to be understood that various other adaptations and modifications may be made within the spirit and scope of the embodiments herein. For example, the embodiments have been shown and described herein with relation to LLNs and an IoT network architecture. However, the embodiments in their broader sense are not as limited, and may, in fact, be used with other types of networks and/or architectures. In addition, while certain protocols are shown, such as RPL, LOAD, etc., other suitable protocols may be used, accordingly, as the techniques herein are generally managed at the forwarding plane, not the control plane.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a node, a first copy of a packet with an indication of duplicate copies, the indication inserted in the first copy and at least one second copy when a path to a primary parent of a source node is observed to be weak or down;
storing, at the node, an identifier of the first copy of the packet in response to the indication;
receiving, at the node, a second copy of the packet with the indication of duplicate copies;
determining, at the node, whether the identifier of the second copy matches the stored identifier of the first copy;
in response to a match, dropping, at the node, the second copy;
deleting the stored identifier after expiration of a timer; and
returning, by the node, feedback to a source of the packet regarding an amount of duplicate copy drops.

2. The method as in claim 1, wherein the identifier is a hash of the packet.

3. The method as in claim 1, wherein the identifier is a sequence number of the packet.

4. The method as in claim 1, further comprising:
storing the first copy of the packet; and
deciding whether to drop the first or second copy based on a quality of the first or second packet.

5. A method, comprising:
monitoring, at a node, a quality of a primary link; and
forwarding, by the node, a plurality of duplicate copies of a packet in response to a poor quality of the primary link, wherein forwarding comprises:
transmitting, by the node, a first copy of the packet on the primary link with an indication of duplicate copies;
transmitting, by the node, a second copy of the packet on a backup link with an indication of duplicate copies,
wherein the second copy of the packet with the indication of duplicate copies causes nodes receiving the second copy to determine whether the identifier of the second copy matches the stored identifier of the first copy, and to drop the second copy in response to a match;

receiving, by the node, feedback from nodes dropping duplicate copies of the packet regarding an amount of duplicate copy drops at the nodes dropping the duplicate copies; and determining, by the node, a number of N copies to be transmitted based on the feedback from the nodes.

6. The method as in claim 5, further comprising:
including a depth value within duplicate copies of the packet to prevent the duplicate copies from traversing links away from a destination of the packet.

7. The method as in claim 5, wherein the backup link is an arbitrary link.

8. The method as in claim 5, further comprising:
determining a value of N based on a number of acknowledged copies of duplicated packets.

9. An apparatus, comprising:
one or more network interfaces to communicate with a computer network;
a processor coupled to the network interfaces and adapted to execute one or more processes; and
a memory configured to store a process executable by the processor, the process when executed operable to:
receive a first copy of a packet with an indication of duplicate copies, the indication inserted in the first copy and at least one second copy when a path to a primary parent of a source node is observed to be weak or down;
store an identifier of the first copy of the packet in response to the indication;
receive the second copy of the packet with the indication of duplicate copies;
determine whether the identifier of the second copy matches the stored identifier of the first copy;
in response to a match, drop the second copy;
delete the stored identifier after expiration of a timer; and
return feedback to a source of the packet regarding an amount of duplicate copy drops.

10. The apparatus as in claim 9, wherein the identifier is a hash of the packet.

11. The apparatus as in claim 9, wherein the identifier is a sequence number of the packet.

12. The apparatus as in claim 9, wherein the process when executed is further operable to:
store the first copy of the packet; and
decide whether to drop the first or second copy based on a quality of the first or second packet.

13. An apparatus, comprising:
one or more network interfaces to communicate with a computer network;
a processor coupled to the network interfaces and adapted to execute one or more processes; and
a memory configured to store a process executable by the processor, the process when executed operable to:
monitor a quality of a primary link; and
forward one or more duplicate copies of a packet in response to a poor quality of the primary link, wherein the process is configured to forward by:
transmitting a first copy of the packet on the primary link with an indication of duplicate copies; and
transmitting a second copy of the packet on a backup link with an indication of duplicate copies;
wherein the second copy of the packet with the indication of duplicate copies causes nodes receiving the second copy to determine whether the identifier of the second copy matches the stored identifier of the first copy, and to drop the second copy in response to a match to limit duplication of traffic to a limited path segment up to a point where diverse paths remerge;
receive feedback from nodes dropping duplicate copies of the packet regarding an amount of duplicate copy drops at the nodes at the nodes dropping the duplicate copies; and
determine a number of N copies to be transmitted based on the feedback from the nodes dropping the duplicate copies.

14. The apparatus as in claim 13, wherein the process when executed is further operable to:
include a depth value within duplicate copies of the packet to prevent the duplicate copies from traversing links away from a destination of the packet.

15. The apparatus as in claim 13, wherein the backup link is an arbitrary link.

16. The apparatus as in claim 13, wherein the process when executed is further operable to:
determine a value of N based on a number of acknowledged copies of duplicated packets.

* * * * *